United States Patent [19]
Chur

[11] Patent Number: 5,124,849
[45] Date of Patent: Jun. 23, 1992

[54] DATA STORAGE MEDIA CERTIFICATION PROCESS

[75] Inventor: Sung P. Chur, 181 Saratoga Ave., Santa Clara, Calif. 95050

[73] Assignee: Swan Instruments, Santa Clara, Calif.

[21] Appl. No.: 531,885

[22] Filed: Jun. 1, 1990

[51] Int. Cl.$^5$ .............................................. G11B 5/09
[52] U.S. Cl. ........................................ 360/31; 360/46
[58] Field of Search .................. 360/31, 46, 65, 67, 360/68

[56] References Cited
U.S. PATENT DOCUMENTS

| | | | |
|---|---|---|---|
| 3,474,331 | 10/1969 | Chur | 324/34 |
| 3,686,682 | 8/1972 | Behr et al. | 340/174.1 B |
| 3,781,835 | 12/1973 | Dion et al. | 340/174.1 B |
| 4,491,881 | 1/1985 | Hamlon | 360/31 |
| 4,746,995 | 5/1988 | Rauskolb | 360/31 |

*Primary Examiner*—Vincent P. Canney
*Attorney, Agent, or Firm*—Michael J. Hughes

[57] ABSTRACT

A method for detecting aberrations in a digital data storage medium, such as a magnetic media disk. In a media certifier, a series of signal pulses is produced by reading data previously written to a medium is examined for differential variations between each signal pulse and at least one other of those signal pulses in the local area of the medium. A signal indicative of such differential variations is isolated by means of a CYCOMP circuit (54) and/or a band reject circuit (140). The CYCOMP circuit (54) works by delaying a previously produced signal for comparison to the cycle of the signal presently being produced and then producing a differential signal representing any instantaneous difference between the two signals. The band reject circuit (140) works by eliminating any frequency content that would be present in a series of normal signals and thus isolating any asynchronous signal that is indicative of an aberration. Both the CYCOMP circuit (54) and the band reject circuit (140) use comparators (114), (118) and (152) to determine if any detected differential signal rises above a preset error indication threshold.

9 Claims, 4 Drawing Sheets

DATA STORAGE MEDIA CERTIFICATION PROCESS

TECHNICAL FIELD

The present invention relates generally to electronic data storage media and more particularly to a certification process useful in the manufacture of data storage media. The predominant current usage of the improved certification process of the present invention is as a means to quickly and accurately check for imperfections in magnetic data storage media during a manufacturing process.

BACKGROUND ART

The recent proliferation of the use of computers and data processing has brought about a need for great quantities of electronic data storage devices and data storage media for use in such devices. An essential part of the manufacturing process of such media is certification. Certification is the general term for the processes of testing the media for defects and then classifying the media according to criteria such as defect quantity and location. The demands of the market and the industry, as compared to the present capabilities of manufacturing processes used to produce data storage media are such that nothing less than 100% testing of the media is acceptable. Furthermore, recent increases in required data density have created a need for even more stringent testing. Because a considerable expense in both time and equipment is involved in the 100% testing of media, it would obviously be desirable to find a way to reduce the time required for such testing. However, any method for speeding up the process cannot be allowed to interfere with the quality of the testing.

Numerous tests have been devised, each of which has been thought to provide some indication of the quality and/or usefulness of the media under test. These can be generally classified as parametric tests which are performed at certain designated locations on a medium and as defect scan tests which are performed on the entire recording surface. Two defect scan tests are the Missing Pulse Test and the Extra Pulse Test. These two test are thought to be essential basic tests for data storage media.

The Missing Pulse Test is a two step process involving first the writing of data onto a media at a maximum anticipated data density, and then the reading back of the just written data to verify that each of the just written data locations properly reproduces a pulse. Additionally, a "modulation" test, wherein a certifier looks for periodic fluctuations in pulse characteristics, can be performed simultaneously with the Missing Pulse Test. Additional tests, such as a "peak shift" test, wherein excessive deviation of the points of maximum amplitude of a signal from expected locations is the criteria of a media defect, may also be performed at this time. A test method wherein a "peak shift" type test is used as the primary means of detecting media defects is taught in U.S. Pat. No. 3,686,682 issued to Behr et al.

The Extra Pulse Test is, in many respects, an antithesis of the Missing Pulse Test. A medium, or areas of a medium, that should not contain data is checked to verify that no signal is present which might incorrectly be interpreted as a data bit.

Whether these tests are performed on an entire medium surface at a time, or upon sequential portions, current practice dictates the use of at least four process steps to accomplish the combination of the Missing Pulse Test and the Extra Pulse Test. Generally, an area is overwritten with data, then read to accomplish the Missing Pulse Test, then erased of all data (by a direct current signal, in the case of magnetic media), and then read to accomplish the Extra Pulse Test. U.S. Pat. No. 3,480,331, issued to the present inventor, has taught a method wherein eight process steps were used to accomplish these two tests, in order to improve the reliability of the tests.

Since the Extra Pulse Test and the Missing Pulse Test are thought to be necessary to be performed on every data location of every manufactured medium, most of the cost in time and expense incurred during media testing are a result just these two tests. Several methods have been developed in the prior art to speed up media testing. Examples are found in U.S. Pat. No. 4,746,995 issued to Rauskolb and in U.S. Pat. No. 3,781,835 issued to Dion et al. However, all of the prior art methods have either sacrificed some accuracy of the test (as, for instance, by not actually checking all specific data locations) or have not effectively sped up the process in application.

It should be noted that, while the Missing Pulse Test and the Extra Pulse Test are but two of a number of tests normally performed on data storage media, they are the tests which most directly correlate to actual usage criteria. The qualities of reproducing a pulse where one has been recorded, and of not producing a pulse where none has been recorded are the sine qua non of a properly functioning storage medium. Therefore, it might seem that it would be best to try to exactly duplicate the conditions of actual use during such testing. This is particularly true since, in actual usage, automatic gain control circuitry is used to compensate for variances in a particular medium and in such factors as variations in linear speed past a read/write head as a function of radial displacement on rotating media. In fact, that is essentially what is conventionally done for the Missing Pulse test. The data is first written to the medium by means closely approximating the actual operation of the "write" circuitry of an end user data storage device, and then is read back in a similarly conventional fashion. An average peak magnitude of the pulses obtained from a local area of the media can be derived, against which the individual pulses my be compared in order to ascertain if any of the individual pulses fall below an acceptable percentage of the local average. However, there are additional problems peculiar to the Missing Pulse Test. Primarily, the problem exists that on areas of a medium that are intentionally devoid of deposited signal, there is no "average" pulse amplitude against which a possible errant pulse might be compared to see if it exceeds a maximum error threshold. Indeed, this problem was one of those addressed by the present inventor's '331 patent, cited previously. Several other methods of solving this problem have been employed, including retaining local area averages obtained from a prior Extra Pulse Test for use in the Missing Pulse Test.

Obviously, it would be desirable to be able to test for Extra Pulse during the Missing Pulse portion of a test, without having to first DC erase the media. However, all of the prior art data media certification processes within the inventor's knowledge, which have attempted to test both for defects at individual data locations which could cause extra pulses and for defects at individual data locations which could cause missing pulses, have employed a multi step process to test for missing pulse and an additional process to test for extra pulse.

Yet another trend in the industry has increased the desirability of an improved test method. Due to the great quantities of hard disk media that is being manufactured, the makers of hard disk assemblies (HDA) have found it to be economical to forgo testing of media until the HDA is assembled. Completed HDA are tested at each data location after assembly. But it would be unrealistic to expect that there will be no faulty locations in an entire HDA having millions of individual locations. Therefore, a routing table, which differentiates usable and unusable locations, is made and stored at a designated location on the medium. Since this test must be performed, it is thought to be redundant to test the media before assembly. Of course, this means that if there are excessive media defects, a completed HDA may have to be rejected at final testing. However, as long as there are sufficiently few rejected units, it is more economical to just test the finished HDA, but this introduces additional considerations. One way to test the HDA is to simply write to it, and then to read back what has been written through the user access ports in the same manner that data will be written and then read during actual use. In fact, this is what is now frequently being done. Unfortunately, this test method allows locations that are only barely able to reproduce a data pulse to be deemed acceptable. As the machine ages and circuit characteristics change slightly, such locations may well eventually be a source of problems.

Clearly, it would be better to tap into the HDA circuitry at the analog level and to do a test similar to the media certification test described previously. However, because of the excessive amount of time that would be required to perform such a test using conventional methods, manufacturers have generally opted for the quicker digital output test. An additional reason for this choice is that the circuitry of many HDA will not allow for a DC erase, and thus a conventional EP test on such units is not possible.

A method which could provide a higher reliability test at the analog level and yet be run quickly enough to be economically feasible would obviously be desirable. However, no prior art certification process, to the inventor's knowledge, has been capable of meeting these criteria. Furthermore, no prior art media certification process, to the inventor's knowledge, has successfully reduced the number of process steps required for media certification while maintaining or improving the accuracy of the test. All successful applications to date have been a compromise between accuracy and speed.

DISCLOSURE OF INVENTION

Accordingly, it is an object of the present invention to provide a process for data storage media certification that can be performed more quickly than conventional processes.

It is another object of the present invention to provide a process for data storage media certification which is more sensitive to critical variances than conventional processes.

It is still another object of the present invention to provide a data storage media certification process that will detect media defects not caught by conventional processes.

It is yet another object of the present invention to provide a data storage media certification process which can be performed using existing hardware with only relatively minor modifications.

It is still another object of the present invention to provide a data storage media certification process which can economically and reliably test for media defects.

It is yet another object of the present invention to provide a data storage media certification process that can be performed on completed HDA at the analog level.

Briefly, the preferred embodiments of the present invention utilize a media certification tester which writes a series of data pulses to the media and then reads back the just written pulses. Indications of missing pulses are examined in a conventional manner. However, instead of performing a separate test for extra pulse, the same signal that is inspected for indications of missing pulse is examined for characteristics indicative of an extra pulse type problem.

A first preferred embodiment of the invention utilizes a cycle delay and compare method wherein each of the signals derived from the reading of the pulses is effectively electrically compared to a signal produced by the reading of a subsequent local pulse. Significant variations in magnitude, wave shape, or phase between the two compared pulses are considered to be indicative of a media defect. For instance, if the magnitude of any portion of the pulse under test is significantly greater than the magnitude of the corresponding portion of the comparison pulse, either the comparison pulse is excessively low (indicating a potential drop out error), or the pulse under test is excessively high (indicating a potential extra pulse error). It should be noted that the indication of a potential extra pulse error in this example is predicated upon the assumption that the excessive magnitude of the pulse under test is a result of either there being a residual or false pulse image already present at the relevant media location prior to the testing, or of an excessive tendency of the medium at that location to convert an incoming signal (either intentional or "stray") into a stored pulse, and/or of an inability of the medium to properly erase at the relevant location. While this "extra pulse" indication may or may not provide a directly correlative result to that which might have been obtained using the prior art Extra Pulse Test, it is certainly indicative of the potential problem causing media defect of concern, and the inventive process is more sensitive to this type of defect than prior art tests.

A second preferred embodiment of the invention utilizes a band reject filter to eliminate the fundamental quasi-sinusoidal component of the read back signal. Signal remaining after the fundamental quasi-sinusoidal component has been eliminated is any phase asynchronous noise which was modulated over the read back signal. The output threshold of the remaining signal may be detected at a prescribed threshold.

An advantage of the present invention is that far less time is consumed in testing than is necessary for conventional certification processes.

A further advantage of the present invention is that certain media defects are detected which might have gone undetected using previous processes.

Yet another advantage of the present invention is that testing to more critical values is possible than can be accomplished using conventional certification processes.

Still another advantage of the present invention is that the inventive process can be implemented using conventional hardware with only relatively minor modifications.

Yet a further advantage of the present invention is that it allows an extra pulse test to be performed in an automatic gain control mode, thus providing a realistic test criteria.

Still another advantage of the present invention is that the inventive process is useful for testing both data storage media and completed head/disk assemblies for data storage.

These and other objects and advantages of the present invention will become clear to those skilled in the art in view of the description of the best presently known modes of carrying out the invention and the industrial applicability of the preferred embodiments as described herein and as illustrated in the several figures of the drawing.

BEST MODE FOR CARRYING OUT INVENTION

The best presently known mode for carrying out the invention is a magnetic data storage media certification process embodied in a data storage media certification apparatus which has been constructed so as to implement the inventive process in testing rotating magnetic media. The predominant expected usage of the inventive data storage media certification process is in the data processing industry, particularly in the mass production of data storage media wherein both accuracy and speed of testing are desirable. A rotating magnetic data storage certification apparatus (certifier) as is used to implement the preferred embodiment of the present invention is illustrated in block schematic form in FIG. 1 and is designated therein by the general reference character 10. In many of its substantial components, the certifier 10 does not differ significantly from conventional certifiers. The physical structure is similar to that of prior art certifiers such as that illustrated and described in the inventor's prior patent, U.S. Pat. No. 3,474,331.

Figure 1:
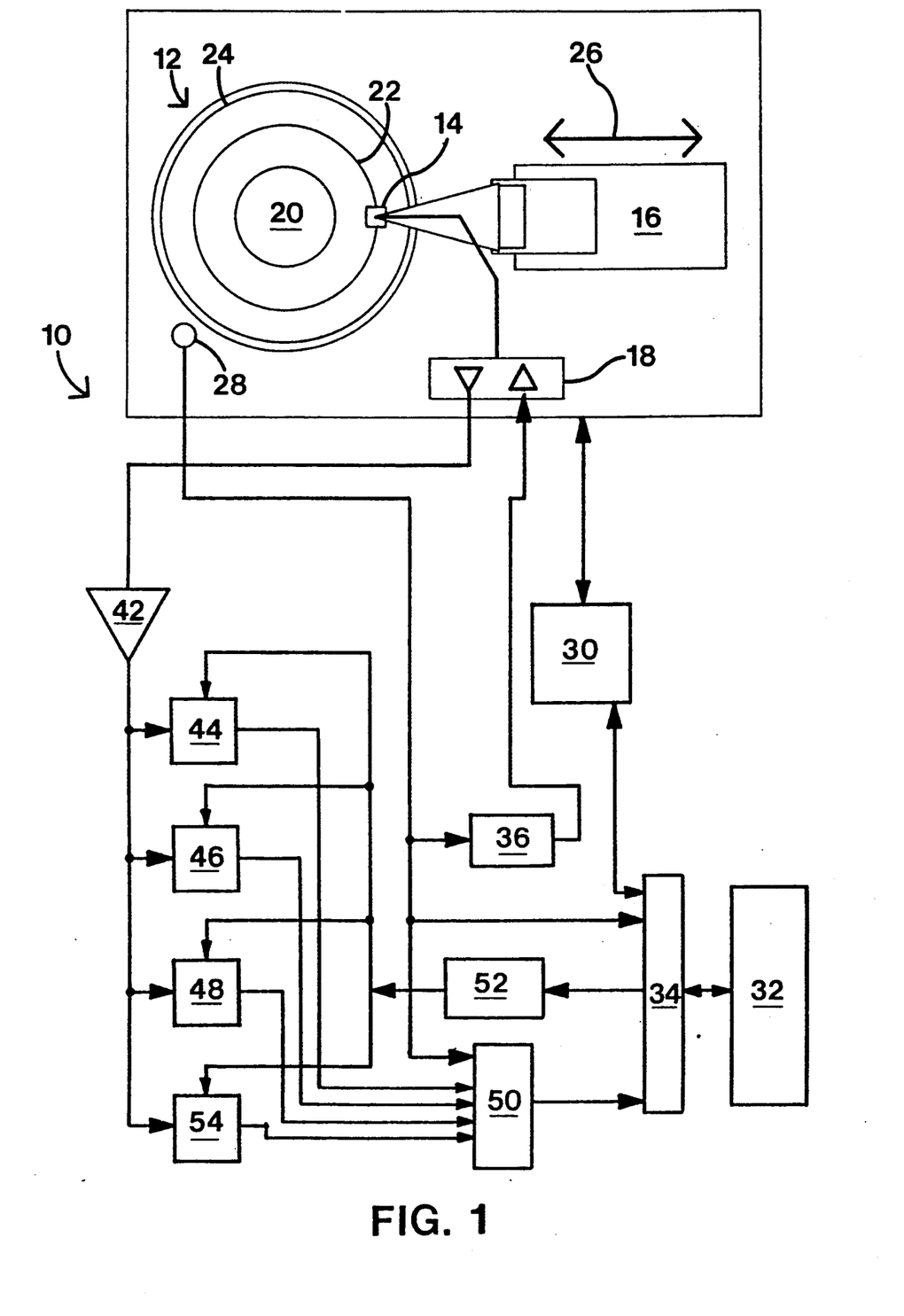
FIG. 1 is a block diagram of a rotating magnetic media certification system constructed in accordance with the present invention.

The conventional elements of the certifier 10 include a medium disk 12 which is to be tested, a read/write head 14, a head positioning mechanism 16, and a read/write head interface amplifier 18. In the certifier 10, as in the usual usage of the magnetic medium disk 12, the disk 12 rotates on a spindle hub 20 past the read/write head 14. Concentric tracks 22 are located on the disk 12. The tracks 22 are that portion of the disk 12 that passes under the read/write head 14 at designated positions of the read/write head 14. The tracks 22 are not physically manifested on the disk 12, but rather they are simply the locations dictated by convention and standard as being given distances from a standard reference track location 24. The concentric tracks 22 are produced on the disk 12 by physically moving the read/write head 14 inward and outward, in a plane indicated in the drawing by an arrow 26, by means of the head positioning mechanism 16. The techniques and circuitry used for locating tracks 22, and for positioning the read/write head 14 in relation thereto, are well known and commonly practiced in the industry. A rotational index sensor 28 provides an index signal from which relative rotational data locations on the disk 12 may be calculated.

An additional conventional component of the certifier 10 is a spin and control electronics section 30, which utilizes conventional motor control circuitry (not shown) to control the spin of the disk 12 and the physical location of the read/write head 14.

A control CPU 32 directs and monitors the operations of the certifier 10 through a conventional CPU interface electronics section 34. To commence testing, the control CPU 32 causes the spin control electronics section 30 to bring the disk 12 to speed, and to position the read/write head 14 over a track 14 to be tested. Then, a write control circuit 36 sends a test pattern 38 (FIG. 3) to be written onto the track 14 through the head interface amplifier 18. The test pattern 38 is a series of electrical pulses emulating a series of data bits such as might be written during actual usage of the disk 12. As is to be expected with data bits emanating from digital devices, the test pattern 38 has only two states (zero voltage, and some positive value of voltage) such that the test pattern 38 is in the form of a pulse or square wave. In the conventional manner, the test pattern 38 produced by the write control circuit 36 causes alternate magnetic alignment of those portions of the surface of the disk 12 whereon the test pattern is "written". A pair of iterations of a quasi-sinusoidal wave shape signal (read back signal) 40 is then produced upon read back. The nature of the paired iterations of the read back signal 40 will be discussed in more detail hereinafter in specific regard to the present invention.

The test pattern 38 is written during a single revolution of the disk 12. On a next subsequent revolution of the disk 12, the head interface amplifier 18 is caused by the control CPU 32 to switch to read mode and a read amplifier 42 amplifies the read back signals 40. The output of the read amplifier 42 is then fed to a missing pulse detect circuit 44, a modulation detect circuit 46, and a bit shift detect circuit 48, all of conventional construction.

Upon detection of an error by the missing pulse detect circuit 44, the modulation detect circuit 46, or the bit shift detect circuit 48, a pulse is sent to an error log circuit 50 which makes a record of the number and locations of such errors as are detected. It should be noted that the missing pulse detect circuit 44, the modulation detect circuit 46, and the bit shift detect circuit 48 each receive an input signal from a test threshold control unit 52. The test threshold control unit 52, under the direction of the control CPU 32 controls the values of signal parameters against which the various error detect circuits 44, 46, and 48 compare respective parameters of the read back signals 40 received from the read amplifier 42. The fact that the comparison parameters are not hard wired into the circuitry of the error detect circuits 44, 46, and 48, allows for adjustment of those comparison parameters through operator input to the control CPU 32.

It should also be noted that, as depicted in FIG. 1, the error logic circuit 50 and the CPU interface electronics section 34 both receive input from the rotational index sensor 28, thus also enabling those units to have a reference from which relative instantaneous rotational position of the media disk 12 can be calculated.

All of the above features of the certifier 10 of the best presently known embodiment of the present invention are of conventional construction and are of a type well known and widely practiced in the art. The various interconnections, control connections from the control CPU 32, and connections to power sources not shown in the block diagram of FIG. 1 which complete those portions of the certifier 10 are all, likewise, of conventional construction, and are readily found in media certifiers now in common usage. The block diagram of FIG. 1 is not, therefore, intended herein to be an exhaustive description of prior art certifiers, but rather it is a reference from which the unique features of the present invention may be taught.

In order to implement the present invention, a cyclic compare extra pulse detect circuit (CYCOMP circuit) 54 is added to the conventional circuitry as depicted in FIG. 1. In like manner to the other error detect circuits 44, 46, and 48, the CYCOMP circuit 54 evaluates the signal supplied by the read amplifier 42, and sends an error pulse to the error log circuit 50 when measured parameters exceed maximum set error threshold parameters. Also, in like manner to the other error detect circuits 44, 46, and 48, the CYCOMP circuit 54 receives an input from a portion of the test threshold control unit 52 which represents the error threshold parameters as entered into the control CPU 32 by an operator or by operating software.

Figure 2:
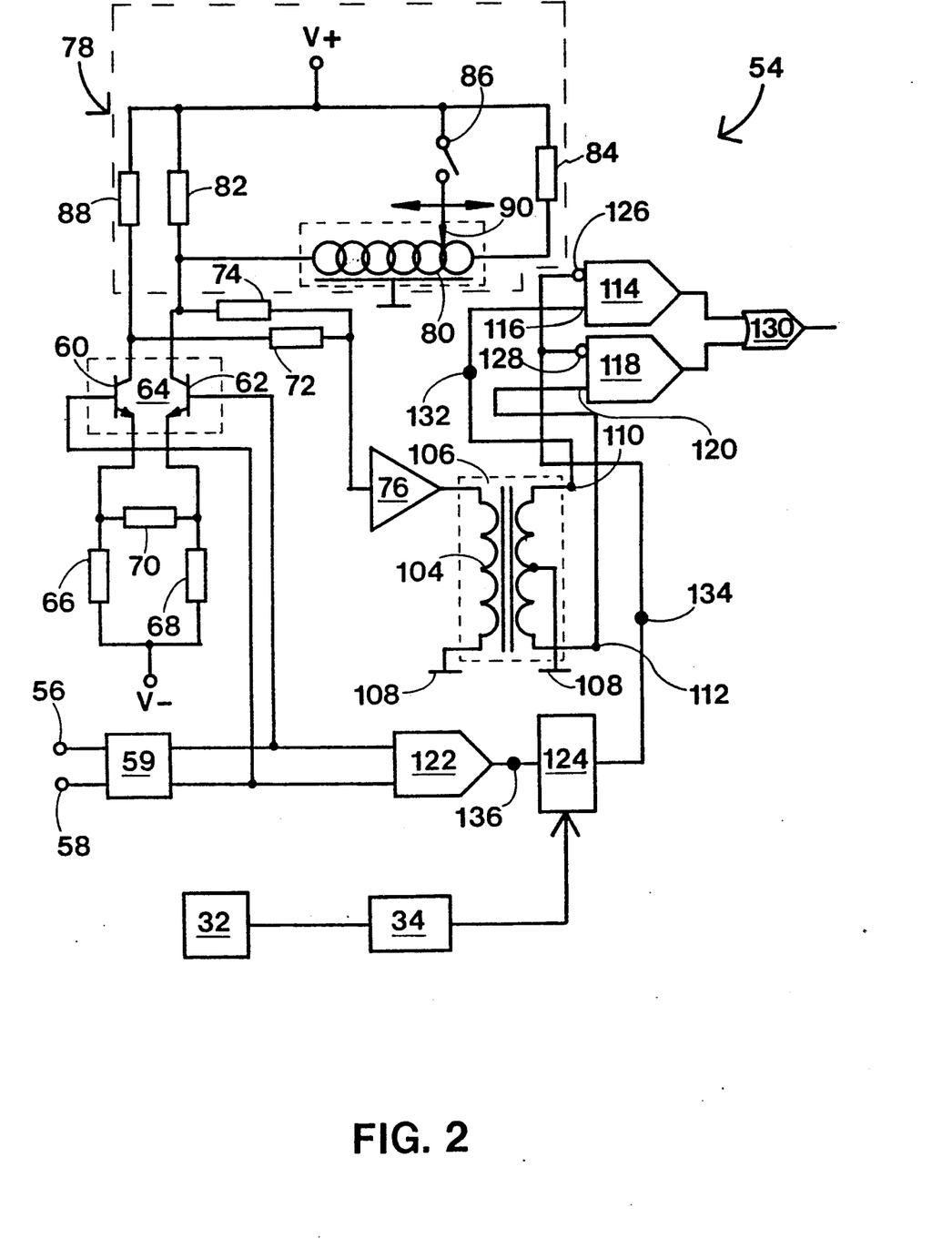
FIG. 2 is a schematic and block diagram of a cycle delay and comparison portion of a media certification system according to the present invention.

Referring now to FIG. 2, wherein is shown a more detailed schematic and block diagram of the CYCOMP circuit 54, a read signal 40 (FIG. 3) enters the circuit through an X signal input 56 and a Y signal input 58. The read signal 40 (FIG. 3) is what is known as a differential signal pair. As is customary in magnetic media reading devices, the read/write head 14 is an enclosed magnetic pick up coil tapped at each end so as to simultaneously produce a pair of 180° out of phase iterations of the read back signal 40 (FIG. 3) in response to magnetic field fluctuations (representing data stored on the medium) on its two output wires. It would be possible to ground one end of the coil that is the read/write head 14, and to write and retrieve data using only a one read signal 40 and completing the signal path through a signal ground reference. Indeed, the present invention could also be modified to operate in such a manner. However, the advantages of differential pair signals, as discussed herein, would thereby be lost.

In order to avoid any possible confusion, it should be emphasized that what is being referred to as the paired iterations of the read back signal 40, rather than being two different signals is, in effect, actually the same signal 40 appearing simultaneously in versions of opposite polarity (relative to each other) at the two signal inputs 56 and 58. The paired iterations of the read back signal 40 are amplified by the head interface amplifier 18 (FIG. 1) and the read amplifier 42 (FIG. 1), and they are brought to a desired peak amplitude level by means of an automatic gain control circuit 59. The read signal 40 is processed as a differential pair in order to reduce the effects of noise on these low amplitude signals. Since they are carried and processed on identical, parallel signal paths, the two iterations of the read signal 40 tend to pick up identical noise. When eventually one of the iterations of the read signal 40 is phase inverted and combined (electrically summed) with the other, any noise present on both iterations (common mode noise) is self cancelled.

Referring again to FIG. 2, a first transistor 60 and a second transistor 62 form a differential amplifier 64. Gains of the first transistor 60 and the second transistor 62 are set by a first gain resistor 66, a second gain resistor 68, and a differential gain adjusting resistor 70. Outputs of the transistors 60 and 62 are summed through a first summing resistor 72 and a second summing resistor 74. A differential signal boosting amplifier 76 is fed by the summed outputs of summing resistors 72 and 74.

A delay circuit 78 is formed using a variable lumped constant type delay line 80, a first delay line terminating resistor 82, a second delay line terminating resistor 84, a delay line output shorting switch 86, and an X signal collector terminating resistor 88. Insertion and return losses are minimized by selecting the terminating resistors 82 and 84 to be of the same value as the approximate characteristic resistance of the delay line 80. The adjustable delay line is adjusted to have a delay time to the delay tap 90 of one half the period of the read signals 40, which is the time period in which the read signals 40 travel through one half cycle or 180° (although other settings, such as times which are multiples of that period, could be made to work.) Adjustment of the delay time is critical to the practice of the invention and it must be carefully calibrated to be precisely the fraction or multiple of the period of the read back signals 40 for which the remainder of the CYCOMP circuit 54 is configured. Ordinary calibration techniques of signal comparison using an oscilloscope, or other means, can be employed to make this adjustment.

During normal operation of the certifier 10, the delay line output shorting switch 86 is closed. This effectively shorts the output of the delay line 80 from the delay line tap 90 and takes the second delay line terminating resistor 84 out of the circuit. A curious but well known characteristic of delay lines is that, if the output is shorted, the signal will be reflected back toward the input and phase inverted. By comparison, if the output end of a delay line is left unterminated, or open, the input signal will be reflected back but not phase inverted. Of course, if the delay line is terminated with its characteristic impedance, it will not reflect back a signal at all (with the exception of a small amount of unwanted reflection). Therefore if, for instance, the delay time is adjusted to be one half the period of the input signal (as here), the input signal will actually appear at the delay line input delayed by 360° and phase inverted as compared to the original input signal.

Since, as described above, a read back signal 40 is reflected back toward the collector of the second transistor 62 delayed by one full cycle and phase inverted while, at the same time, a next cycle of the read back signal 40 is being amplified by the second transistor 62, the sum of the signals appearing at the collector of the second transistor 62 and at the input side of the second summing resistor 74 would theoretically be zero, provided that the signal waveform of the following cycle is identical to that of the leading cycle. Any deviation between the cycles would appear as a non-zero electrical sum signal. However, since the ideal delay line has not been invented, some adjustment for losses which are incurred in the delay line 80 must be made. This is accomplished by signal provided through the first summing resistor 72. The resistance value for the first summing resistor 72 is considerably different than that for the second summing resistor 74. Values of the components involved and explanation for the relative values required to practice the invention as embodied in the presently preferred embodiment are as follows: For reasons explained previously, the delay line terminating resistors 82 and 84 are chosen to be equal to the characteristic impedance of the delay line 80 (200Ω in the present embodiment). Given the characteristics of the delay line and its terminations, this means that the collector of the second transistor 62 is looking into a resistance of one half the value of the first terminating resistor 82, or 100Ω. Therefore, the value of the X signal collector terminating resistor 88 is chosen, for convenience sake, to be equal to the resistance value seen by the Y signal collector. Of course, other values could be used, but it is easier to select appropriate comparative values if the operational characteristics of the first transistor 60 and the second transistor 62 are kept as similar as is possible. A value for the second summing resistor is selected which is at least considerably greater than the impedance of the delay line 80 so as not to significantly affect the above described delay effect. In the preferred embodiment, the value of the second delay line terminating resistor 84 is 1,000Ω. Then, finally, the value of the first summing resistor 72 is chosen so as to sum just enough of the signal from the output of the first transistor 60 back into the output of the delay line 80 to compensate for losses in the delay line 80. For example, if the peak value of the amplified read back signals 40 at the collectors of the transistors 60 and 62 is 1 volt (this is not necessarily the case, as this value is variable by adjustment within the embodiment, but it is a good rough approximation for purposes of example), and if the loss in the delay circuit 78 is 20%, or 0.2 volt, then the signal reflected back from the delay line 80 would be 0.8 volt peak and the combined signal at the input side of the second summing resistor 74 would be 0.2 volt peak (assuming a "good" signal in which there are no error indications). In order to compensate for the losses of the delay line 80, a small amount of signal from the output of the first transistor 60 is summed back into the signal through the first summing resistor 74. It should be noted that, as discussed previously, the signal reflected back from the delay line 80 is delayed by 360° and phase inverted, and the signal appearing at the collector of the first transistor 60 is of opposite phase to that appearing at the collector of the second transistor 72. Therefore, the signal from the collector of the first transistor 70 is in phase with the signal reflected back from the delay line 80 (albeit 360° behind). Since, in this example, the object is to effectively cancel the 0.2 volt signal appearing at the input of the second summing resistor 74 with a portion of the one volt peak phase opposite signal appearing at the input of the first summing resistor 72 (a ratio of 1 to 5), and since the value of the second summing resistor 74 has been chosen to be 400Ω, the value of the first summing resistor 72 should be 5·400Ω = 2,000Ω. The values of the first gain resistor 66, the second gain resistor 68, and the differential gain adjusting resistor 70 will be elaborated upon hereinafter in connection with a discussion of set up and calibration of the certifier 10.

Alternative configurations of the delay line 80 and related circuitry could also be made to work. For instance, it might be more practical to divide the variable delay line 80 into two units connected in series, wherein one non-variable unit provides most of the delay, and a short delay time variable unit provides for the necessary adjustment. Another approach, of course, would be to reconfigure the delay circuit 78 such that the delay line 80 provides the entire delay time required (rather than just half, as in the present configuration), and the "reflecting back" phenomenon is not employed. Of course, this latter alternative would require additional, or more expensive, delay lines.

Referring now again to FIG. 3, an example of an irregular read signal (trailing signal) 92 is depicted, as is a delayed irregular read signal (leading signal) 94 which is actually the same trailing signal 92 delayed by 360°. (Note that the designations "leading" and "trailing" are somewhat arbitrary, as an argument could be made that, given another reference frame, it would be more proper to reverse these names. These are chosen here as appropriate because the delayed signal 94 "leads" the non delayed signal 92 in the sense that a common reference point on the former has been generated one period prior in time as compared to that same reference point on the latter.) The trailing signal 92 and the leading signal 94 are similar to the (normal) read back signal 40 except for the inclusion of a high cycle 96 and a low cycle 98. It should be noted that, in this example, irregularities are shown to be relatively symmetrical. That is, the irregularities appear on both the positive and negative going portions of a cycle. This sort of irregularity is relatively common. However, it is also common that an irregularity might appear on only one half of a cycle. As will be appreciated from the discussion of the means for detecting errors in the CYCOMP circuit 54, hereinafter, this distinction is not material to the operation of the present invention, as the CYCOMP circuit 54 will detect either type of error. It should also be noted that, for purposes of this one example, the small alteration of leading signal 94 wave shape that results from feeding in a small portion of signal through the first summing resistor 72, as discussed previously, is ignored for clarity sake, and the leading signal 94 is considered to be an exact duplicate of the trailing signal 92, delayed by one full cycle.

Now referring again to FIG. 2, it can be recognized that any signal appearing at the input of the differential signal boosting amplifier 76 represents a differential between two consecutive cycles of the input read signals 40. Given the example of the trailing signal 92 and the leading signal 94 (FIG. 3), a resulting differential signal 100 would manifest a non-zero deviation 102 wherever the signals 92 and 94 are not identical.

Figure 3:
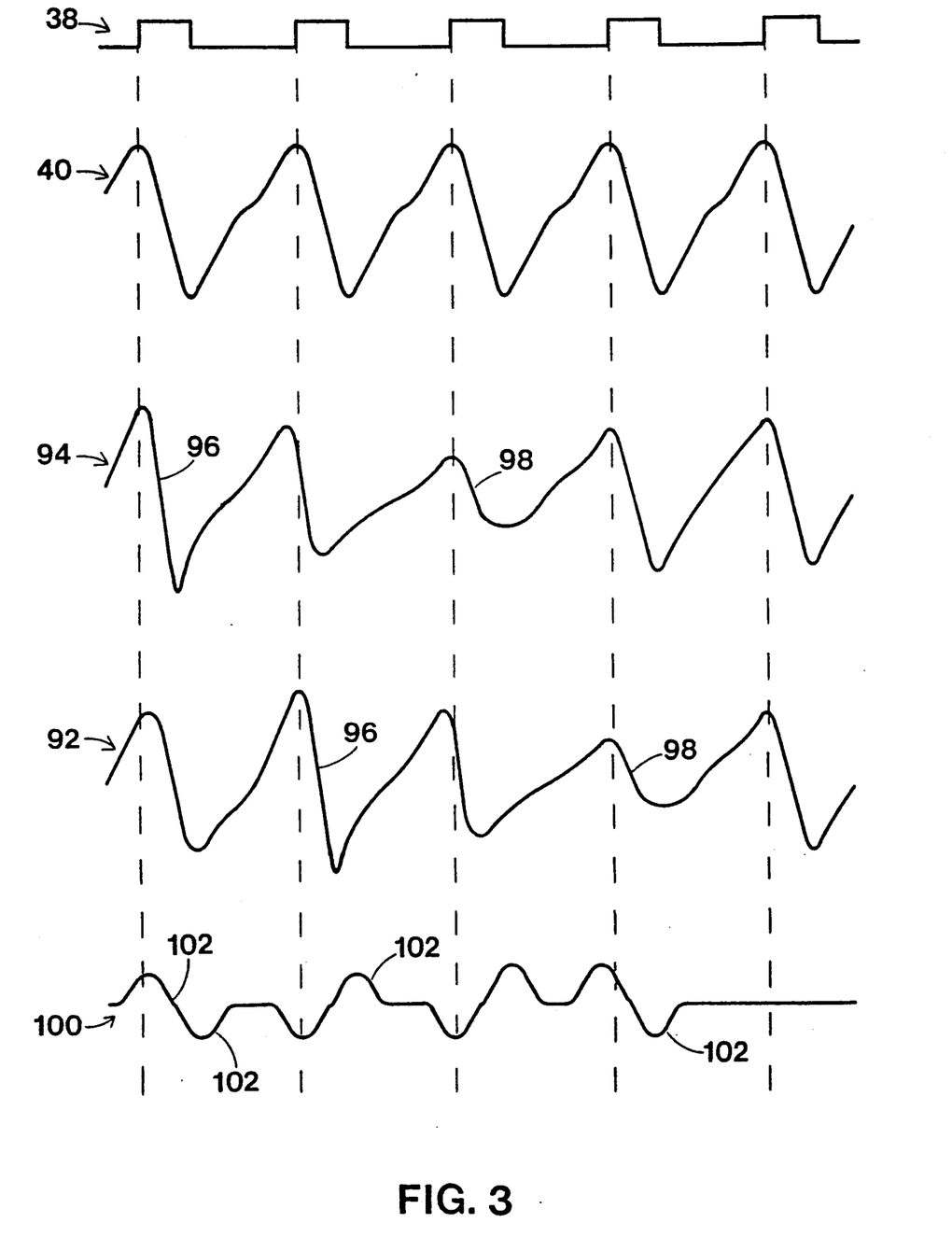
FIG. 3 is a timing diagram showing timing relationships and relative wave shapes of signals relevant to the operation of the invention.

One skilled in the art will now appreciate that such a non-zero deviation 102 will occur whenever the abnormal signal 96 or 98 is presently occurring on either the trailing signal 92 or the leading signal 94. Therefore, if an error indication occurs, there will almost certainly be, in fact, two such indications reported relating to two consecutive cycles of the read back signal 40. This is not at all a problem, since it is wise to tag as defective at least a few data locations on each side of any detected problem area. This is because an error indication is an indication of a physical aberration on the media, the nature of which cannot be known exactly. Therefore it is prudent to avoid trying to use the immediate locale of such an anomaly for the storage of important data.

The differential signal boosting amplifier 76 drives the primary 104 of a center tapped transformer 106. Whether an instantaneous excursion occurring at the output of the differential signal boosting amplifier 76 is positive going or negative going, both a positive going differential signal and a negative going differential signal will be produced relative to a signal ground 108. Depending upon the polarity of the instantaneous output of the differential signal boosting amplifier 76, a first transformer output terminal 110 will be instantaneously either positive going or negative going, and a second transformer output terminal 112 will then be of the polarity opposite to that of the first transformer output 110. As can be seen in the drawing, a first comparator 114 has a first comparator differential signal input 116 fed from the first transformer output 110, and a second comparator 118 has a second comparator differential signal input 120 fed from the second transformer output 112.

Now beginning a discussion of derivation of a signal to which the differential signal 100 is to be compared, a peak follower 122 receives inputs of the read signal 40 from the X signal input 56 and the Y signal input 58. The peak follower 122, as is well understood in the field, produces a quasi direct current signal output which varies with the peak value of its inputs, and provides this voltage to an input of an extra pulse error level digital to analog convertor (EP-DAC) 124. The EP-DAC 124 is provided in order to allow the user of the certifier 10 to program in a test threshold level by means of the control CPU 32 and control interface electronics section 34. The EP-DAC 124 converts digital input from the control interface electronics section 34 into an output which is a percentage of the prevailing value of the output of the peak follower 122. Circuits such as the EP-DAC 124 are well known and widely practiced in the field. In fact, the EP-DAC 124 does not differ significantly from the other prior art test threshold controls 52 found in the certifier 10. The EP-DAC 124, in fact, is located within the test threshold controls 52 in the presently preferred embodiment of the certifier 10.

The output of the EP-DAC 124 is fed to a first comparator test threshold input 126 on the first comparator 114, and a second comparator test threshold input 128 on the second comparator 118. Either of the comparators 114 and 118 will produce an output if and only if the signal voltage level at its respective differential signal input 116 and 118 is more positive than the reference voltage level present at its respective comparator test threshold input 116 and 128.

As can be appreciated from the above discussion, the signal arriving at the comparator test threshold inputs 126 and 128 is a direct current signal which is an amplified percentage of the present average peak value of the X signal input 56 and the Y signal input 58. Exactly what percentage is decided by the operator or by software controlling the control CPU 32. The decision as to what test threshold level to set depends, of course, upon an assessment as to what degree of sensitivity to a potential error indication is desired. The inventor has found that a test threshold level that is adjusted to be 25 percent provides a workable compromise between desired sensitivity to actual error indications and unwanted sensitivity to minor unimportant fluctuations. As will be seen hereinafter, in relation to a discussion of calibration of the CYCOMP circuit 54, a relationship is maintained between the voltage level of the output of the peak follower 122 and the signal output of the transformer output terminals 110 and 112 such that those signals would be instantaneously equal where, for instance, a series of even normal pulses is interrupted by a totally missing pulse (that is, by a portion of the read signal 40 totally devoid of signal excursion). Therefore, the output signal at the comparator test threshold inputs 126 and 128 also represents a percentage of the input to the comparator differential signal inputs 116 and 120 that would occur during that sort of (essentially worst case) error indication. This relationship means that the percentage of the peak follower 122 output which is forwarded by the EP-DAC 124 also represents the percentage of the maximum potential error indication that will be allowed before an error signal is generated. This standardization greatly simplifies the making of decisions as to what percentage level is to be considered acceptable, and allows such decisions to conform to any industry standards which might be forthcoming for acceptable percentage deviation of individual signal pulses.

It is important to note that it is the nature of the peak follower 122 to react rather slowly to deviations in peak amplitudes. Therefore, the output of the peak follower 122 represents the average peak value of the signal inputs 56 and 58 over at least a few tens of cycles, rather than an instantaneous value for a single cycle. This is most desirable, as it is intended that any signal aberrations detected by the CYCOMP circuit 54 be judged according to a standard set by the signal amplitude characteristic of the local area of the medium 12 under test, and not just the amplitude of a cycle immediately preceding or immediately following the aberration (since the preceding or following cycle might not, itself, be a "good" pulse).

As discussed above, the comparators 114 and 118 are intended to contrast the value of any differential signal that might be present at their differential signal inputs 116 and 120 to a test threshold DC level present at their test threshold inputs 126 and 128. The two comparators 114 and 118 are necessary (rather than just one) because a bipolar comparator is not available. This relates back to the previously mentioned problem that an error indication cannot be expected to always be symmetrical. That is, an aberration might appear only on the positive going half cycle, or only on the negative going half cycle. This explains the need for the center tap type transformer 106 and the two comparators 114 and 118. As previously discussed, the center tap transformer 106 simultaneously produces both negative going and positive going half cycles in response to any input to the primary 104 whether the input half cycle is negative going or positive going. Note that it is not important which of the two transformer output terminals 110 and 112 delivers the positive going half cycle. It is sufficient that one or the other of the transformer output terminals 110 and 112 will deliver a positive going half cycle to one of the comparator differential signal inputs 116 and 120 whenever there is a differential signal input to the transformer primary 104.

By way of example, in the case where a negative going half cycle is produced at the first transformer output terminal 110 and a positive going half cycle is produced at the second transformer output terminal 112, the first comparator differential signal input 116 would certainly not be more positive than the first comparator test threshold input 126, and no output pulse would be produced by the first comparator 114. However, a positive going pulse at the second comparator differential signal input 120 might or might not be greater than the positive voltage present at the second comparator test threshold input 128. If, indeed, the second differential signal input 120 goes more positive than the second test threshold input 128, then an error would be indicated, and the second comparator 118 would produce an output pulse. It should now be apparent that both the first comparator 114 and the second comparator 116 should not simultaneously produce an output.

An "or" gate 130 is provided as a convenient means of combining the outputs of the first comparator 114 and the second comparator 118 into a single error indication output, which output is provided to the error logic circuit 50 (FIG. 1) to be processed as are any of the error indications derived from prior art sources in the certifier 10.

Now beginning a brief explanation of the setting of comparative signal levels, in order to calibrate the CYCOMP circuit 54 the delay line output shorting switch 86 is opened and a known constant signal (as from a signal generator) is provided to the X signal input 56 and the Y signal input 58. In this condition the delay line 80 is properly terminated by the first delay line terminating resistor 82 and the second delay line terminating resistor 84, and thus no signal is reflected back. The values of the first gain resistor 66, the second gain resistor 68, the differential gain adjusting resistor 70, and a gain setting resistance of the differential signal boosting amplifier (not shown) are selected such that, in this mode, the peak signal level at a first test point 134 or at a second test point 134 is equal to the direct current voltage level at a third test point 136 (the output of the peak follower 122). A technician can fine tune these adjustments in the calibrate mode either by varying the gain of the differential signal boosting amplifier 76 or by varying the resistance of the differential gain adjusting resistor 70. As has been discussed heretofore, this relationship of signal values assures that a percentage value (of the output of the peak follower 122) as set by an operator and as sent to the EP-DAC 124 by the control CPU 32 represents a percentage of deviation from local area signal average which might be expected from a deviation of the differential signal 100 (FIG. 3) which is equal to that local signal area average.

One consideration that may occur to one skilled in the art involves the situation wherein the signal level of the read signal 40 suddenly drops off and then maintains a lower level for some appreciable period of time before returning to a normal level. It will be observed that the CYCOMP circuit 54 of the present invention will register an error signal at the beginning of this occurrence and another error signal at the end, but will not register error signals during the intervening period. However, as one skilled in the art will also be aware, the modulation detect circuit 46 (FIG. 1) of the certifier 10 is intended to pick up just this sort of error, and no harm is done by the fact that the CYCOMP circuit 54 might miss portions of this particular type of aberration.

As can be appreciated from the above discussion, the CYCOMP circuit 54 can be adjusted to be very sensitive to deviations that might well not be detected using prior art extra pulse error detection methods. Furthermore, as one skilled in the art will readily appreciate, it is important to note that a phase error as well as amplitude error will show up as a a non-zero differential signal (and thus, as an error indication, if the differential signal is sufficiently large), since a phase error will also result in an instantaneous difference in the compared signals. Also, a missing pulse error will be detected by the method implemented by the CYCOMP circuit 54, since a differential signal is produced in that instance as well. As can be appreciated, the inventive method might well require some rethinking as to what standards are applicable for media certification. In fact, the inventor has found that a single standard for missing pulse and extra pulse type detection using the inventive method, which will both eliminate the need for the separate missing pulse detection circuitry 44 and will also provide a more reliable overall test standard, is feasible.

A second embodiment of the invention is a band reject method of implementation. A circuit to implement the alternative embodiment of the invention (band reject circuit) is illustrated in block schematic form in FIG. 4, and is indicated therein by the general reference character 140. Like the CYCOMP circuit 54 (FIG. 2), the band reject circuit has as its purpose the detection of signal cycles containing aberrations that would be indicative of extra pulse type errors (as well, perhaps, as missing pulse type errors). The band reject circuit is tapped into the output of the read amplifier 42 of the certifier 10 (FIG. 1) in the same manner as previously discussed in relation to the CYCOMP circuit 54 (FIG. 2), and also in the same manner as are the missing pulse detect circuit 44, the modulation detect circuit 46, and the bit shift detect circuit 48 (FIG. 1).

Figure 4:
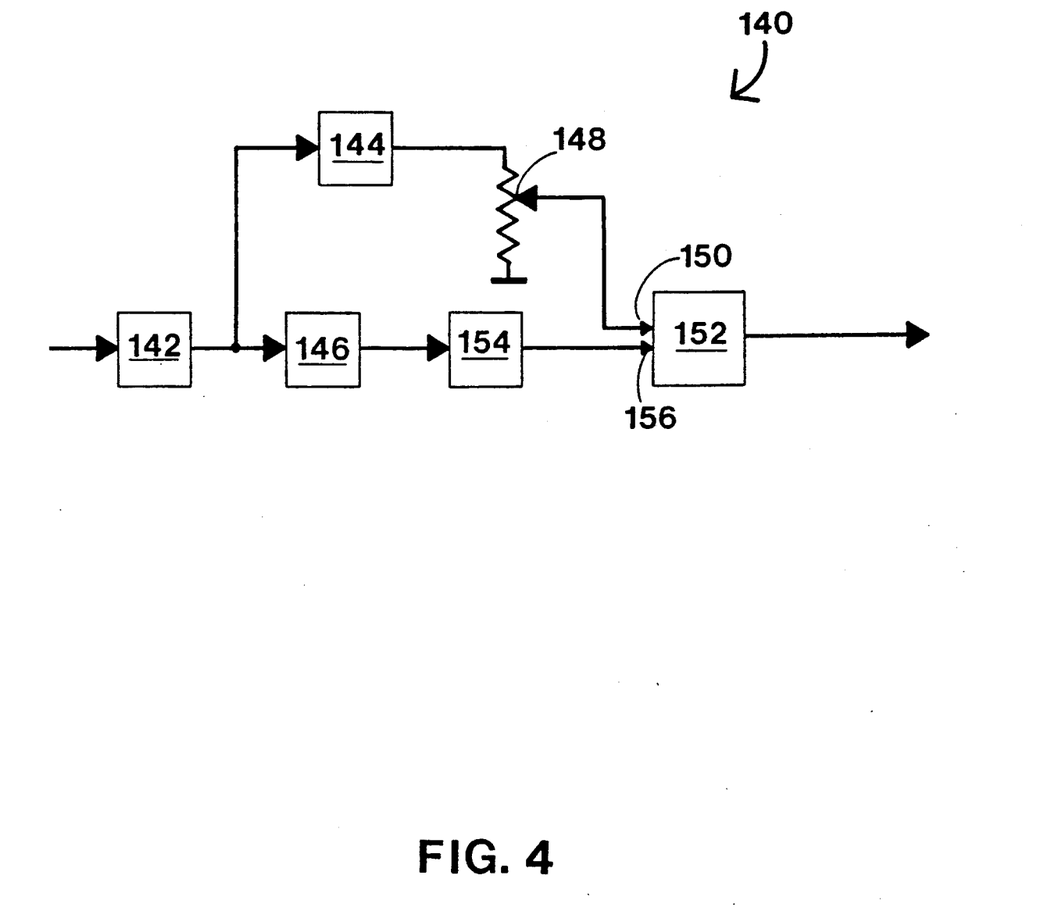
FIG. 4 is a block schematic diagram of a circuit to implement a band reject method of differential signal detection according to the present invention.

In the band reject circuit 140 the quasi-sinusoidal read back signal 40 (FIG. 3) is provided to an automatic gain control circuit 142 for bringing signal level to that appropriate for the remainder of the circuit. The output of the automatic gain control circuit 142 is fed both to a band reject circuit peak follower 144 (the operation of which type component is discussed previously in connection with the peak follower 122 of the CYCOMP circuit 54), and a band reject filter 146. The band reject filter 146 is an ordinary active filter set to reject the fundamental frequency of the read back signal 40, although the inventor has found that a passive filter (not shown) can also be used for the purpose. The output of the band reject filter 146 represents any phase asynchronous noise modulated over the test signal. This output amplitude may be detected at a prescribed threshold. That threshold is provided by a variable voltage divider 148 which divides off that portion of the direct current output of the peak follower 144 which is fed to a band reject test threshold input 150 of a band reject comparator 152.

The variable voltage divider 148 might, alternatively, be replaced with a digital to analog converter circuit similar to the EP-DAC 124 of the CYCOMP circuit 54 (FIG. 2) to enable a test threshold to be set via the control CPU 32, as discussed herein in relation to the CYCOMP circuit 54.

In the presently preferred alternative embodiment of the invention 140, a low pass filter 154 is placed in the signal path in front of the comparator 152. The low pass filter 154 is designed to roll off third harmonics of the read back signal 40, since the quasi-sinusoidal shape of the read back signal 40 makes it rich in third harmonic content. As can be seen in the block diagram of FIG. 4, the signal, having been filtered of basic frequency and of third harmonic content is provided to a test signal input 156 of the band reject comparator 152. If the signal level present at the test signal input 156 rises above that present at the band reject test threshold input 150, the comparator 152 outputs an error indication to the error logic circuit 50 (FIG. 1).

As can be appreciated, the band reject circuit 40 is not as effective at detecting errors as is the CYCOMP circuit 54. However, it does effectively implement the inventive principle with considerably less complexity and expense. It is thought by the inventor that, perhaps, the band reject circuit 40 might be useful as an adjunct to the CYCOMP circuit 54 to implement the inventive method for detecting aberrations, rather than as a substitute therefor.

As is shown above, in great part, the certifiers 10 and the improved data media certification process according to the present invention closely resemble prior art conventional certifiers and data certification processes in many respects. The substantial difference exists in inclusion of circuitry to implement the inventive process. No significant changes of materials are envisioned nor are any special constructions required to implement the inventive process. All parts used are standard commonly available electronic components.

Various modifications may be made to the invention without altering its value or scope. For example, the best mode for carrying out the invention is described herein in terms of a certification process and hardware for testing rotating magnetic data storage media. The same process is, however, equally applicable to linear (streaming) data storage media. Similarly, the process is equally adaptable to the certification of non-magnetic data storage media such as erasable optical media or any type of media wherein bits of digital information are stored in an essentially analog form.

Another conceivable change would be to adopt a "unified error detection threshold" which would be a differential signal threshold which could be considered to be an indication of either extra pulse or missing pulse type errors. This concept is valid, since any differential signal would seem to be indicative of either type of error.

All of the above are only some of the examples of available embodiments of the present invention. Those skilled in the art will readily observe that numerous other modifications and alterations may be made without departing from the spirit and scope of the invention. Accordingly, the above disclosure is not intended as limiting and the appended claims are to be interpreted as encompassing the entire scope of the invention.

INDUSTRIAL APPLICABILITY

Certifiers and certification systems are necessary to the production of data storage media. The predominant current usages are for testing magnetic media, both rotating and streaming. However, newer technologies, such erasable optical media also require certification which is similar in its relevant aspects to the certification discussed herein. Improved data media certification process of the present invention may be utilized in any application wherein conventional certification processes are used. The main area of improvement is in the ability to check for excessive residual signal indication on a medium without the necessity of additional or separate process steps, and in the improved accuracy of a test conducted utilizing the inventive process.

An application of the inventive method which might be of particular significance is in the area of the testing of completed head disk assemblies (HDA). Rather than just using currently practiced method of detecting error locations in HDA at the digital output level, a HDA manufacturer could tap into the analog read signal and divert the signal to a CYCOMP circuit for error detection processing. This is a much more effective means of error detection, since it would reveal signal aberrations that are indicative of media defects which presently lie just below a problem threshold but which might develop into a problem as the HDA ages. The inventive method, as discussed above, is considerably faster than any conventional analysis of the analog signal. By way of example, the inventor has projected a savings of very roughly 3 minutes per disk in testing 40 track two sided disk mechanisms given a typical read/write rate Furthermore, the inventive method can even offer significant time savings over the ineffective digital level test which is currently popular. However, it is thought that the primary advantage of the inventive method in this application lies in the fact that a much more accurate test can be performed without sacrificing test speed.

Since certifiers to implement the improved data media certification process of the present invention may be readily constructed and are physically significantly similar to prior art conventional certifiers, it is expected that they will be acceptable in the industry as substitutes for the conventional certifiers. For these and other reasons, it is expected that the utility and industrial applicability of the invention will be both significant in scope and long-lasting in duration.

I claim:

1. A method for detecting faults in a digital storage medium, in steps comprising:
    a) writing a series of bits of digital information to the medium;
    b) transforming the series of bits of digital information into a plurality of read back signal cycles wherein each of said cycles is a product of one of the series of bits of digital information previously written;
    c) extracting from said cycles an error signal comprising any instantaneous deviation between a portion of any of said cycles and a corresponding expected normal instant signal level; and
    d) comparing said error signal to a reference value and registering an error indication when said error signal exceeds said reference value, wherein
    said error signal is extracted from each of said cycles by continuously comparing each of said cycles to a comparison signal, said comparison signal comprising a phase inverted version of a previous cycle.

2. The method of claim 1, wherein:
    a non-zero value of said error signal is produced by any amplitude deviation between any of said cycles and said comparison signal.

3. The method of claim 1, wherein:
    a non-zero value of said error signal is produced by any phase deviation between any of said cycles and said comparison signal.

4. The method of claim 1, wherein:
    said error signal is extracted from said cycles by removing from said cycles a basic component of said cycles, said basic component comprising a fundamental frequency of said cycle, and;
    said basic component which is removed from said cycles further includes a plurality of lower harmonics of said fundamental frequency.

5. In a process for detecting errors present in a digital storage medium read back signal, including the steps of writing data to the medium, reading back the data just written in order to produce the read back signal, and examining the read back signal by various conventional means to detect errors, the improvement comprising:
    further examining each of a plurality of cycles of the read back signal for an instantaneous high voltage level, said instantaneous high voltage level being any instantaneous voltage level which is higher than an expected instantaneous voltage level, and;

examining each of the plurality of cycles of the read back signal for an instantaneous low voltage level, said instantaneous low voltage level being any instantaneous voltage level which is lower than said expected instantaneous voltage level, wherein;

said expected instantaneous voltage level is zero volts, and said instantaneous high voltage level and said instantaneous low voltage level include any signal present after removing a fundamental frequency and any of a plurality of lower harmonic frequencies from the read back signal.

6. An apparatus for detecting signal cycle aberrations in a digital storage medium read back signal, including:

a delay means for delaying the read back signal to produce a delayed read back signal, said delayed read back signal being delayed by at least one period of the read back signal;

an inverting means for inverting said delayed read back signal thus producing an inverted delayed read back signal;

a summing means for summing the read back signal with said inverted delayed read back signal such that any instantaneous difference between the read back signal and said delayed read back signal produces an aberration signal;

a peak following means for establish a direct current voltage level representing a prevailing value of peak values of the read back signal;

a error detect threshold selection means for establishing an error detect threshold as a percentage of said direct current voltage level; and an error detection means for producing an error signal when an absolute value of said aberration signal exceeds said error detect threshold.

7. The apparatus of claim 6, and further including:

a filtering means for filtering a fundamental frequency from the read back signal thus producing a filtered read back signal;

an auxiliary error detect threshold selection means for establishing an auxiliary error detect threshold as a percentage of said direct current voltage level; and an auxiliary error detection means for producing an error signal when an absolute value of said filtered read back signal exceeds said auxiliary error detect threshold.

8. The apparatus of claim 6, wherein:

said delayed read back signal is delayed by an amount such that each of a plurality of cycles of the read back signal is summed with an inversion of a next previous of said cycles, said next previous of said cycles having the characteristic of being the last of said cycles to be examined such each of said cycles sequentially becomes the next previous of said cycles with each new repetition.

9. The apparatus of claim 8, and further including:

a loss compensation means for summing a portion of the read back signal into said delayed read back signal, said portion being just sufficient to compensate for losses occurring in said delay means such that, for those portions of the read back signal wherein all sequential of said cycles of the read back signal are identical, the read back signal and said delayed read back signal are of equal magnitude.

* * * * *